United States Patent [19]

Heil et al.

[11] Patent Number: 4,915,769

[45] Date of Patent: Apr. 10, 1990

[54] MASKING MACHINE

[75] Inventors: Robert H. Heil, New Richmond, Wis.; Frederic A. Longworth, Shoreview; Allen J. Rivard, White Bear Lake, both of Minn.

[73] Assignee: Minnesota Mining and Manufacturing Company

[21] Appl. No.: 326,015

[22] Filed: Mar. 20, 1989

[51] Int. Cl.[4] .......................... B32B 35/00; B26F 3/02

[52] U.S. Cl. .................................... 156/527; 156/577; 156/579; 225/38; 225/77

[58] Field of Search ............... 156/523, 527, 574, 577, 156/579, 544; 225/38, 77, 78, 88; 221/70

[56] References Cited

U.S. PATENT DOCUMENTS 3,125,264 3/1964 English, Jr. .......................... 225/78

4,379,019 4/1983 Pool .................................... 156/554

4,425,182 1/1984 Jones et al. ......................... 156/527

*Primary Examiner*—Michael Wityshyn

*Attorney, Agent, or Firm*—Don J. Flickinger; Jordan M. Meschkow; Lowell W. Gresham

[57] ABSTRACT

A pin extending along an axis which is mutually parallel to the axis of rotation of a roll of tape and the axis of rotation of a roll of masking sheet in a masking machine deflects tape inboard from the normal tangential path between rolls whereby the tape is coursed into overlapping engagement while the edge of the roll of masking sheet material. An auxiliary roll of tape is rotatably carried by a subframe which is slidably engagable with a slot formed in the frame of a masking machine. The subframe, which is removable, is automatically retained by a manually releasable detent.

7 Claims, 1 Drawing Sheet

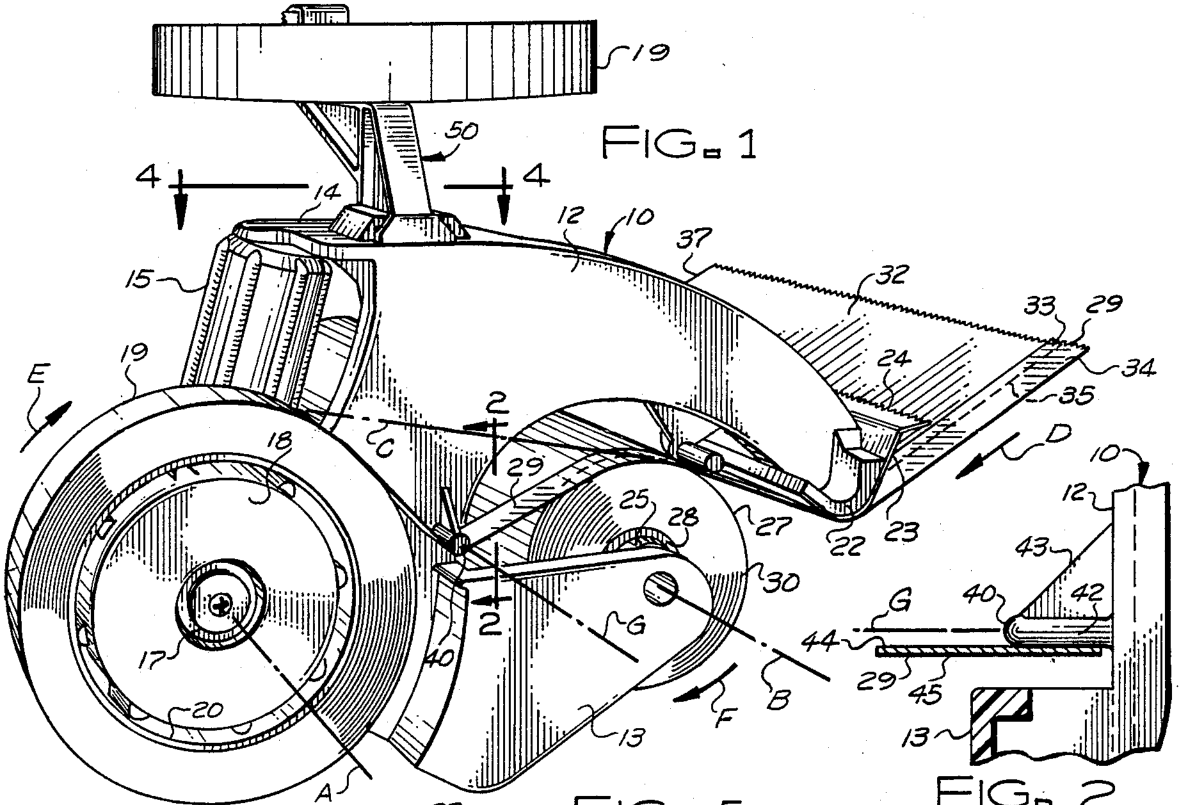
FIG. 1
FIG. 2
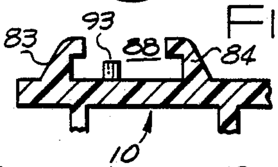
FIG. 5
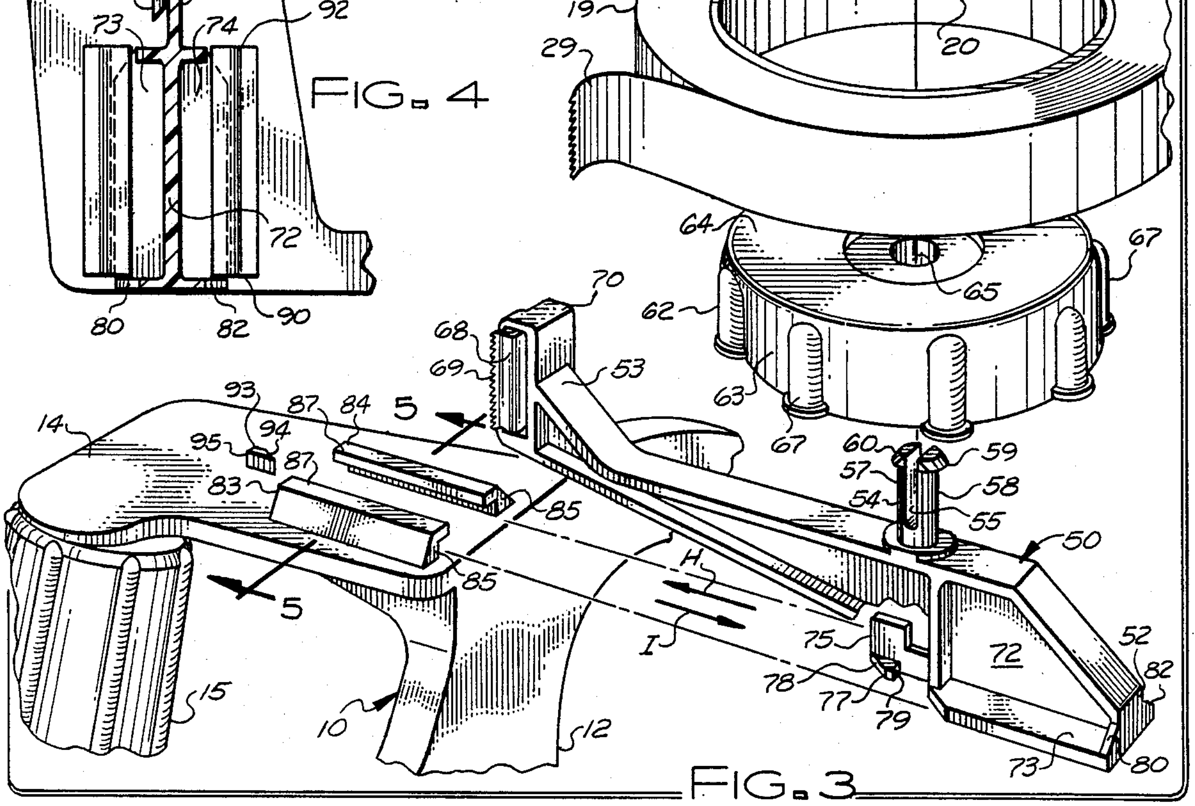
FIG. 4
FIG. 3

MASKING MACHINE

BACKGROUND OF THE INVENTION

1. Field of the Invention

This invention relates to masking machines.

More particularly, the invention relates to apparatus of the type especially adapted for dispensing sheet material and tape for use in masking surfaces.

In a further and more specific aspect, the present invention concerns improvements for enhancing the utility of conventional masking machines 2. The Prior Art The prior art is replete with various devices, generally referred to as masking machines, which are especially useful during preparation for finishing procedures such as painting and trimming. Commonly, the devices dispense sheet material and tape for application to a surface for protection from a finish or treatment applied to an adjacent surface. Familiar exemplary uses are observed in building decoration and in automotive body finishing.

Having achieved substantial success, masking machines are commercially available in a variety of sizes and configurations to accommodate various specific uses Noted, for example is the relatively large, bulky apparatus known as an apron machine. Being stationarily mounted, this machine dispenses an apron of taped sheet for application to a remote surface. Equally notable is the relatively lightweight, compact hand held masking machine which is moved over a surface as sheet material and tape are concurrently dispensed and applied.

Commonly, masking machines include a frame having a holder for carrying a roll of coiled sheet material and another holder for supporting a roll of coiled, pressure sensitive tape. The holders, which are rotatably mounted upon spindles and have parallel axis of rotation, are oriented such that the tape is applied along and overlapping an edge of the sheet material during dispensing. An elongate cutting edge, also carried by the frame and extending parallel to the axis of the holder, serves to sever the tape and sheet material. The hand held units further include a handle.

Masking machines were originally devised for use in combination with sheet material and tape having widths within defined finite limits. Sheet material for hand held machines, for example, usually had a width in the range of four inches to eighteen inches. The larger apron machines could accommodate sheet material as wide as forty-eight inches. Tape having a width of one-half or three-fourths inch was usable with both.

Conventionally, masking sheet material has been in the form of a relatively heavyweight paper which has been treated to be substantially liquid impervious. A desired length of the paper sheet, having been trimmed to a selected width, is coiled about a paper core.

Coiled from flat stock, the finished roll has a width which is synonymous with the width of the paper sheet. The size of a roll, width and length of the coiled sheet material, which is usable in combination with a hand held machine is confined within practical limits of bulk and weight. While weight is generally not a consideration in connection with apron machines, the spacing between frame members imposes a limitation upon the maximum width of roll.

Recently, considerable attention has been directed to increasing the versatility of masking machines through the use of extended width sheet material. To this end, the art has advanced the use of plastic material, such as polyethylene, which can be folded and refolded prior to being coiled. Accordingly, sheet material having a width several times the previous standard has become possible.

The use of plastic sheet material, however, has revealed certain previously unrecognized limitations of prior art masking machines. In contrast to the firm, unyielding, edge of a roll of conventional paper sheet, a roll of folded plastic sheet presents a soft, flexible edge as a result of the peculiarities of folding. Accordingly, mutual deflection occurs between the tape and the tape receiving edge of the sheet material. The phenomenon is enhanced by the smooth, slick surface of the plastic.

Experimentation has also detected another factor which inhibits satisfactory adherence of the tape to the edge of the sheet material. Tape being drawn from a roll has an inherent tendency to track laterally. The lateral displacement, which is directly proportional to the cohesiveness and to the width of the tape, negates the desired overlapping alignment between the tape and the edge of the coiled sheet material. Although particularly pronounced in combination with the soft edge of a roll of folded plastic sheet, the problem exists independent of the composition or configuration of the sheet material.

Further identified is another area of interest and concern. Users of masking machines frequently carry an auxiliary roll of tape particularly for the purpose of taping along the free edge of an applied sheet. For convenience, the prior art has provided means for supporting an independently usable roll of tape upon the frame of the masking machine.

In accordance with the prior art, the device is installed upon the frame by permanent means, such as a screw. Therefore, the device, an auxiliary tape dispensing unit, is limited to use in combination with the masking machine.

Accordingly, it is an object of the present invention to provide improvements for masking machines.

Another object of the invention is the provision of means whereby a masking machine is readily usable with alternate coiled sheet material, such as folded plastics.

And another object of the invention is to provide means which accommodate the use of exceedingly wide tape.

Still another object of the instant invention is the provision of improvements for guiding and tacking tape from the roll thereof to the roll of sheet material.

Yet another object of the invention is to provide improved means for aligning and applying tape upon the edge of a roll of sheet material.

Yet still another object of this invention is the provision of improved means for mounting an auxiliary roll of tape upon a masking machine.

And a further object of the invention is to provide means whereby an auxiliary tape dispenser is quickly and conveniently attachable to or removable from a masking machine.

Yet a further object of the immediate invention is the provision of improvements which can be readily practiced in connection with prior art masking machines.

Still a further object of the invention is to provide improvements which will materially enhance the utility of the masking machine without introducing encumbrances.

And yet a further object of the invention is the provision of improvements, according to the above, which can be simply and economically practiced with conventional skills and procedures.

SUMMARY OF THE INVENTION

Briefly, to achieve the desired objects of the instant invention in accordance with a preferred embodiment thereof, first provided are tracking means carried by the frame of a masking machine for coursing tape from the roll thereof to the edge of the roll of coiled masking sheet. The tracking means intercepts the tape at a location intermediate the roll of tape and the roll of masking sheet and deflects the tape from the normal path of travel which is along a line mutually tangent to both rolls. Preferably, the tracking means includes a tracking surface which bears against the back or non-adhesive side of the tape. In a more specific embodiment, the tracking surface extends along an axis which is substantially parallel to the plane defined by the axes of the roll of tape and of the roll of masking sheet. Further, the tracking surface resides inboard of a line mutually tangent to the roll of tape and to the roll of masking sheet.

Next provided are dispensing means for supporting an auxiliary roll of tape and attachment means for detachably securing the dispensing means to the frame of a masking machine. Preferably, the dispensing means includes a subframe and the attachment means includes an element of engagement pair carried by the frame of the masking machine and a complemental element of the engagement pair carried by the subframe. The element and the complemental element of the engagement pair are relatively movable between an engagement position and a separation position. The dispensing means may include an auxiliary roll holder rotatably carried by the subframe for supporting an auxiliary roll of tape and cutter means carried by the subframe for selectively severing tape drawn from the auxiliary roll.

In accordance with a more specific embodiment, the attachment means further includes detent means for releasably retaining the engagement pair in the engagement position. The elements of the engagement pair are movable between the engagement position and the separation position in reciprocal directions along a linear axis. Stop means limit the relative movement between the element and the complemental element in a direction toward the engagement position.

BRIEF DESCRIPTION OF THE DRAWINGS

The foregoing, and further and more specific objects of the instant invention, will become readily apparent to those skilled in the art from the following detailed description of preferred embodiment thereof taken in conjunction with the drawings, in which:

FIG. 1 is a perspective view of a prior art masking machine incorporating improvements constructed in accordance with the teachings of the instant invention;

FIG. 2 is an enlarged fragmentary vertical sectional view taken along the line 2—2 of FIG. 1;

FIG. 3 is an enlarged exploded fragmentary perspective view of an upper portion of the apparatus seen in FIG. 1;

FIG. 4 is an enlarged fragmentary horizontal sectional view taken along the line 4—4 of FIG. 1; and FIG. 5 is an enlarged fragmentary vertical sectional view taken along the line 5—5 of FIG. 3.

DETAILED DESCRIPTION OF THE PREFERRED EMBODIMENTS

Turning now to the drawings in which like reference characters indicated corresponding elements throughout the several views, attention is first directed to FIG. 1 which shows a masking machine, specifically illustrated as being of the hand held type, including a frame, generally designated by the reference character 10, having main section 12, offset section 13 and offset bracket 14. Section 13 and bracket 14 are offset in opposite directions from main section 13. Handle 15 extends from bracket 14.

Spindle 17 projects laterally from one end of frame 10. Tape roll holder 18 is mounted upon spindle 17 for rotation about an axis represented by the broken line A. A roll 19 of pressure sensitive tape coiled about core 20 is detachably carried by tape roll holder 18.

Mounting bracket 22, integral with frame 10 at the end opposite spindle 17, detachably supports elongate guide bar 23. Oriented generally perpendicular to frame 10, guide bar 23 includes cutting edge 24 which is substantially parallel to the axis A of tape roll holder 18. It will be appreciated by those skilled in the art, guide bars are available in various lengths to correspond to the width of the masking sheet material being used.

A paper roll holder 25 is supported by offset section 13 for rotation about an axis designated by the broken line B. Axis B is parallel to the axis A. A roll 27 of masking sheet material coiled about core 28 is detachably carried by holder 25.

Normally, in accordance with the prior art, tape extends between the roll 19 of tape and the roll 27 of masking sheet material along a line, represented by the broken line C, which is tangent to both of the rolls. During operation, the apparatus is moved by handle 15 in a direction indicated by the arrowed line D. During movement, tape roll 19 and masking sheet roll 27 rotate in the direction of arrowed lines E and F, respectively. Tape roll 19 is offset relative paper roll 27 such that tape 29 overlaps end 30 of roll 27. During the dispensing operation, sheet 32 being dispensed from roll 27 remains stationary. Tape 29 dispensed and applied to sheet 32 includes a first continuous component 33 which is secured to the edge of sheet 32 and a second continuous component 34 which is continuously adhered to the surface to be masked. For purposes of orientation, sheet 32 is considered to have a fixed edge 35, which is coincident with the edge 30 of roll 27, and a free edge 37.

The foregoing description of the prior art hand held masking machine is set forth for purposes of orientation and reference in connection with the ensuing detailed description of the instant invention. It is understood that the above described masking machine is intended to be typical of hand held and stationary masking machines and is not limiting upon the improvements hereinafter set forth. Further and more specific structure and function of such devices will readily occur to those skilled in the art.

Tape Tracking Means

In accordance with an immediately preferred embodiment of the invention as seen in FIG. 2, a cylindrical pin 40 having outer surface 42 projects from the main section 12 of frame 10 along an axis represented by the broken line designated G. Gusset 43 reinforces pin 40 for purposes which will become apparent as the description proceeds. Referring again to FIG. 1, it is seen that pin 40 resides intermediate tape roll holder 18 and paper roll holder 25 at a location inboard of the line of tangency, represented by the broken line C, of the normal path of tape 29 between the roll 19 of tape and the roll 27 of masking sheet material.

Experimentation has shown that tape being drawn from a roll has an inherent tendency to track laterally. The lateral displacement, which increases in proportion to the cohesiveness and to the width of the tape, negates the desired overlapping alignment between the tape and the edge of the coiled sheet material. Experimentation has shown that tape having a width of two inches will displace sufficiently to be separated from the edge of the roll of sheet material.

Imperical observation has shown that displacing the tape inboard of the normal path of travel between the roll of tape and the roll of masking sheet material and causing the back side of the tape to bear against a surface which is parallel to the plane defined by the axes of rotation of the tape roll holder and of the sheet material roll holder will course the tape along a straight path for effective contact with the sheet material. For purposes of reference, tape 29 in FIG. 2 is shown as haVing a back side 44 and an adhesive side 45. Imperical observation has further shown that a tracking surface having a length of approximately one-half of an inch is sufficient for guiding and coursing tape having a width of two inches. Successful experiments have been conducted using exceedingly cohesive tape, such as the type commonly referred to as duct tape. Success has also been had with rolls having a soft or yielding edge and sheet material having a smooth slick surface, such as fold plastic film.

Auxiliary Tape Dispensing Means

Turning now to FIG. 3 there is illustrated an auxiliary tape dispenser constructed in accordance with the teachings of the instant invention and including an elongate subframe generally designated by the reference character 50. For purposes of reference subframe 50 is considered to have a first end 52 and a second end 53. A spindle 54, projecting upwardly from subframe 50 at a location closer to first end 52 than second end 53, is bifurcated by slot 55 extending inwardly from the free end into fingers 57 and 58. An outwardly directed flange 59 having frustoconically tapered leading edge, is carried at the free end of spindle 54.

Auxiliary tape roll holder 62, in general similarity to primary tape roll holder 18, includes outer cylindrical sidewall 63 and end wall 64. Axial bore 65 extending through roll holder 62 is sized to be rotatably received upon spindle 54. The overall length of bore 65, the thickness of roll holder 62 in the immediate vicinity, is less than the length of spindle 54 between flange 59 and subframe 50. Preferably, subframe 50 and spindle 54 are integrally molded of a plastic material whereby the fingers 57 and 58 are resiliently flexible. Accordingly, tape roll holder 62 is received in snap engagement upon spindle 54. The fingers 57 and 58 are deflected inwardly in response to contact between the beveled surface 60 and the opening to bore 65. Similarly, the fingers 57 and 58 may be manually compressed for removal of the tape roll holder 62.

A plurality of spaced apart outwardly projecting longitudinally extending ribs 67 are carried by sidewall 63 of auxiliary tape roll holder 62. The several ribs 67 engage core 20 to removably retain the auxiliary roll of tape upon holder 62. A blade 68, preferably a thin metallic element, having cutting edge 69 is held by the bracket 70 integrally formed with the second end 53 of subframe 50. Cutting edge 69, which is preferably serrated, extends along a line which is perpendicular to the path of travel of the tape as it is drawn from the auxiliary roll thereof.

Subframe 50 is detachably securable to frame 10 of the masking machine. Subframe 50, proximate first end 52, includes an integrally formed depending portion 72 which terminates with a pair of opposed outwardly directed longitudinally extended flanges 73 and 74 as seen with further reference to FIG. 4. Tabs 80 and 82 project upwardly, for purposes which will be explained presently, from the flanges 73 and 74 proximate the end 52. Tang 75 carrying laterally extending projection 77 extends from depending portion 72 in a direction toward second end 52. With reference to tang 75, projection 77 is defined as having a beveled leading edge 78 and a substantially perpendicular trailing edge 79.

A pair of spaced apart guide members 83 and 84 are carried by frame 10. In accordance with the immediately preferred embodiment of the invention, guide members 83 and 84 are integrally molded with the surface of offset bracket 14. Being mirror images, each guide member 83 and 84 includes an upstanding riser 85 terminating with an inwardly directed lip 87. As seen with greater detail in FIG. 5, the guide members 83 and 84 define a T-slot 88.

For purposes of orientation, guide members 83 and 84, and coincidently T-slot 88 are considered to have a receiving end 90 and rear end 92. Lug 93 projects upwardly from frame 10 at a location spaced from rear end 92 and in line with T-slot 88. Lug 93 includes a beveled leading edge 94 facing in a direction toward the guide members 83 and 84 and a transverse trailing edge 95.

The depending portion 72 of subframe 50 and flanges 73 and 74 define a generally T-shaped member which is slidably receivable within T-slot 88. The slidable movement between the T-shaped member and the T-slot is reciprocal along a linear axis in the first direction indicated by the arrowed line H which terminates with an engagement position and a second direction indicated by the arrowed line I which terminates in the release position. Near the end of movement of subframe 50 in the direction of arrowed line H, surface 78 of projection 77 cammingly engages the surface 94 of lug 93. In response thereto, tang 75 is deflected laterally permitting projection 77 to pass lug 93. Subsequently, the flexible tang 75 relaxes engaging surface 79 with surface 75 to prohibit movement of subframe 50 in a direction indicated by the arrowed line A. Concurrently, tabs 80 and 82 abut the ends 90 of guide members 83 and 84, respectively, to limit movement in the direction of arrowed line H. Accordingly, subframe 50 and frame 10 are retained in the engagement position. For removal of subframe 50 from frame 10, tang 75 is manually urged in a lateral direction and subframe 50 urged in the direction of arrowed line I.

Various changes and modifications to the embodiments herein chosen for purposes of illustration will readily occur to those skilled in the art. For example, while a masking machine of the hand held type was herein chosen for purposes of illustration, it will be appreciated that the improvements set forth herein are readily practicable in combination with other configurations of masking machines such as stationary or apron types. It is also noted that the tape tracking and coursing means specifically illustrated as a pin may assume other forms having a surface extending along an axis which is parallel to a plane defined by the axes of the paper roll holder and of the sheet material roll holder. Further, the T-slot formed by the guide members upstanding from the main frame and the T-shaped member formed by the depending portion of the subframe and the outwardly extending flanges are representative of element and complemental element of other engagement pairs providing a similar function. Other forms of detents for holding the frame and subframe in the engagement position will also occur to those skilled in the art. To the extent that such modifications and variations do not depart from the spirit of the invention, they are intended to be included within the scope thereof which is accessed only by a fair interpretation of the following claims.

Having fully described and disclosed the instant invention and alternately preferred embodiments thereof in such clear and concise terms as to enable those skilled in the art to understand and practice the same, the invention claimed is:

1. In a masking machine including
a frame, and
a roll holder rotatably carried by said frame for supporting a primary roll of tape,
improvements therein for selective convenient access to a source of tape independent of said primary roll of tape, said improvements comprising:
(a) dispensing means for supporting an auxiliary roll of tape, said dispensing means including a subframe; and
(b) attachment means for detachably securing said dispensing means to the frame of said masking machine, said attachment means including
(i) an element of an engagement pair carried by said frame,
(ii) a complemental element of said engagement pair carried by said subframe,
said element and said complemental element being relatively movable between an engagement position and a separation position, and
(iii) detent means for releasably retaining said engagement pair in the engagement position, said detent means including
(1) a first element of a locking pair carried by said frame, and
(2) a second element of said locking pair carried by said complemental element for snappingly engaging said first element.

2. The improvements of claim 1, wherein said element and said complemental element are movable between the engagement position and the separation position in reciprocal directions along a linear axis.

3. The improvements of claim 2, further including stop means for limiting the movement between said element and said complemental element in a direction toward the engagement position.

4. The improvements of claim 1, wherein said dispensing means includes:
(a) an auxiliary roll holder rotatably carried by said subframe for supporting said auxiliary roll of tape; and
(b) cutter means carried by said subframe for selectively severing tape drawn from said auxiliary roll of tape.

5. The improvements of claim 1, wherein:
(a) said first element of said locking pair comprises a lug projecting upwardly from said frame proximate said element of said engagement pair, said lug having a beveled leading edge and a transverse trailing edge; and
(b) said second element of said locking pair comprises
(i) a flexible tang extending from said complemental element, and
(ii) a projection extending laterally from said tang, said projection having a beveled leading edge and a substantially perpendicular trailing edge,
said beveled leading edge of said projection being cammingly engageable with said beveled leading edge of said lug to deflect said tang laterally to pass said lug in response to movement of said engagement pair from said separation position to said engagement position, and said trailing edge of said projection being engageable with said trailing edge of said lug to prohibit movement back to said separation position after said projection has passed said lug.

6. The improvements of claim 1, wherein:
(a) said element of said engagement pair comprises a pair of spaced apart guide members carried on said frame, each of said guide members including an upstanding riser terminating with an inwardly directed lip, said guide members being mirror images of one another and forming a T-shaped slot therebetween; and
(b) said complemental element comprises a generally T-shaped member depending from said subframe, said T-shaped member being slidably receivable in said T-shaped slot.

7. The improvements of claim 6, further including stop means for limiting the movement between said element and said complemental element in a direction toward the engagement position, said stop means comprising a pair of tabs formed on opposite sides of said T-shaped member for abutting the ends of said guide members when said complemental element is fully engaged in said slot.

* * * * *